(12) United States Patent
Inoue

(10) Patent No.: US 10,999,491 B2
(45) Date of Patent: May 4, 2021

(54) CONTROL APPARATUS, IMAGE CAPTURING APPARATUS, CONTROL METHOD, AND STORAGE MEDIUM

(71) Applicant: CANON KABUSHIKI KAISHA, Tokyo (JP)

(72) Inventor: Chiaki Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 16/352,975

(22) Filed: Mar. 14, 2019

(65) Prior Publication Data
US 2019/0297267 A1 Sep. 26, 2019

(30) Foreign Application Priority Data
Mar. 22, 2018 (JP) .............................. JP2018-053733

(51) Int. Cl.
*H04N 5/232* (2006.01)
*H04N 5/247* (2006.01)
*G06T 7/35* (2017.01)
*G06T 7/55* (2017.01)
*H04N 13/00* (2018.01)
*H04N 13/239* (2018.01)

(52) U.S. Cl.
CPC ......... *H04N 5/232122* (2018.08); *G06T 7/55* (2017.01); *H04N 5/232123* (2018.08); *H04N 5/232127* (2018.08); *H04N 5/247* (2013.01); *H04N 13/239* (2018.05); *H04N 2013/0081* (2013.01)

(58) Field of Classification Search
CPC ....... H04N 5/232122; H04N 5/232123; H04N 5/232127; H04N 5/247; H04N 13/239; G06T 7/55
USPC .......................................................... 349/139
See application file for complete search history.

(56) References Cited

U.S. PATENT DOCUMENTS

| | | | |
|---|---|---|---|
| 2006/0173577 A1* | 8/2006 | Takeda ...................... | G06T 7/73 700/245 |
| 2011/0075125 A1* | 3/2011 | Kanayama ............... | G02B 7/28 356/4.06 |
| 2012/0086812 A1* | 4/2012 | Zhang .................. | H04N 17/002 348/187 |
| 2013/0141539 A1* | 6/2013 | Awazu ................. | H04N 13/218 348/46 |

(Continued)

FOREIGN PATENT DOCUMENTS

| JP | 2001148866 | A | * | 11/1999 |
|---|---|---|---|---|
| JP | 2001148866 | A | * | 5/2001 |
| JP | 2013042379 | A | | 2/2013 |

*Primary Examiner* — Zaihan Jiang
(74) *Attorney, Agent, or Firm* — Rossi, Kimms & McDowell LLP (57) ABSTRACT

A control apparatus includes a focus information calculator configured to calculate focus information by using an image signal obtained via a first image capturer, a distance information calculator configured to calculate distance information on a distance to an object by using an image signal obtained via a second image capturer, a correction value calculator configured to calculate a correction value by using the focus information of the first image capturer, and a controller configured to provide a focus control to the first image capturer using the correction value and the distance information.

21 Claims, 8 Drawing Sheets

(56) References Cited

U.S. PATENT DOCUMENTS

| | | | |
|---|---|---|---|
| 2015/0195449 A1* | 7/2015 | Ono | H04N 5/2254 348/349 |
| 2015/0301431 A1* | 10/2015 | Tsai | H04N 5/232125 348/252 |
| 2016/0037023 A1* | 2/2016 | Chen | H04N 5/22521 348/175 |
| 2016/0050351 A1* | 2/2016 | Lee | H04N 5/23212 348/221.1 |
| 2016/0065833 A1* | 3/2016 | Chen | H04N 5/225 348/262 |
| 2016/0100152 A1* | 4/2016 | Park | G06T 7/174 382/154 |
| 2017/0171456 A1* | 6/2017 | Wei | H04N 13/239 |
| 2017/0324950 A1* | 11/2017 | Du | H04N 5/23218 |
| 2018/0095174 A1* | 4/2018 | Mertz | G02B 6/32 |

\* cited by examiner

CONTROL APPARATUS, IMAGE CAPTURING APPARATUS, CONTROL METHOD, AND STORAGE MEDIUM

BACKGROUND OF THE INVENTION

Field of the Invention

The present invention relates to an image capturing apparatus having a plurality of image capturers or imaging units.

Description of the Related Art

Recently, an image capturing apparatuses (stereo cameras) having two image capturers have been widely used in a variety of fields, such as an automobile and a digital camera. Japanese Patent Laid-Open No. ("JP") 2013-42379 discloses an image capturing apparatus that includes two lenses and two image sensors for acquiring an object distance in addition to a main image capturing lens and a main image sensor, and acquires a distance map image using them.

An image capturing visual field is narrow in capturing an object, such as a moving object, using a telephoto lens, and it is thus difficult to recapture the object within the image capturing visual field once the object shifts from the image capturing visual field. Even if the object is captured within the image capturing visual field, it is difficult to instantly complete focusing the telephoto lens. In other words, in capturing the object with the telephoto lens, it is difficult to capture the object within the image capturing visual field and focus on the object at a high speed.

An optical characteristic (such as am optical axis direction and a baseline length) of the image capturing apparatus varies due to the deformation of the component caused by the temperature fluctuation or drop impact, and the distance information calculation result (focus detection result) may contain an error. The image capturing apparatus disclosed in JP 2013-42379 cannot accurately determine a focus position of a main image capturing lens and has difficulties in a high-speed focus control, as the distance information calculation accuracy lowers.

SUMMARY OF THE INVENTION

The present invention provides a control apparatus, an image capturing apparatus, a control method, and a storage medium, each of which can provide an accurate and high-speed focus control.

A control apparatus according to one aspect of the present invention includes a focus information calculator configured to calculate focus information by using an image signal obtained via a first image capturer, a distance information calculator configured to calculate distance information on a distance to an object by using an image signal obtained via a second image capturer, a correction value calculator configured to calculate a correction value by using the focus information of the first image capturer, and a controller configured to provide a focus control to the first image capturer using the correction value and the distance information. An image capturing apparatus according to another aspect of the present invention includes the above control apparatus, and the second image capturer having at least one image capturing optical system.

A control method according to another aspect of the present invention includes the steps of calculating focus information by using an image signal obtained via a first image capturer, calculating distance information on a distance to an object by using an image signal obtained via a second image capturer, calculating a correction value by using the focus information of the first image capturer, and providing a focus control to the first image capturer using the correction value and the distance information. A non-transitory computer-readable storage medium storing a program that causes a computer to execute the above control method is another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 7:
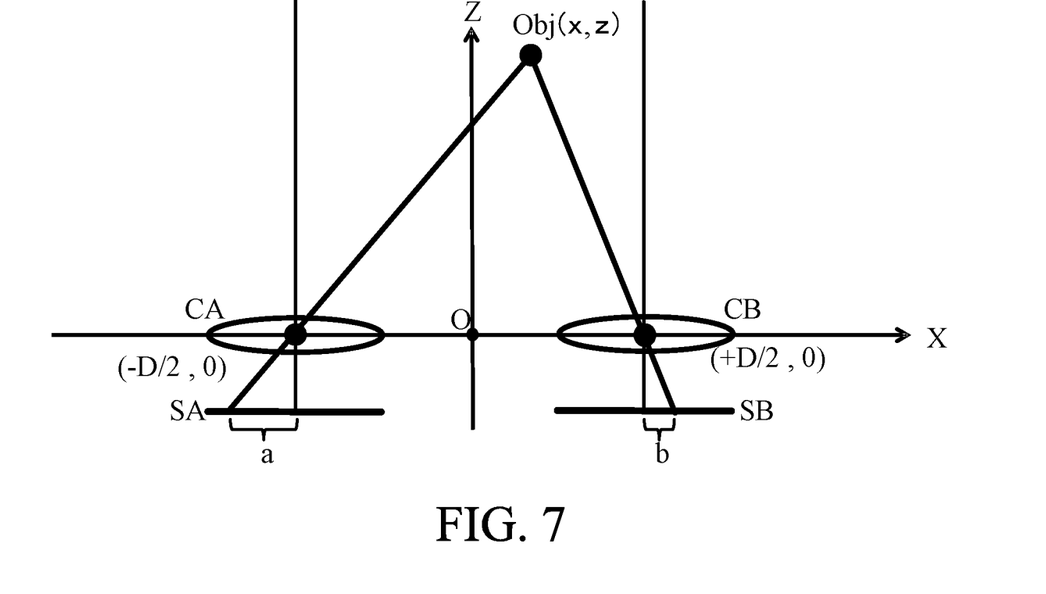
FIG. 7 explain a method of calculating an object distance in each embodiment.

Referring now to FIG. 7, a description will be given of a method of acquiring an object distance using two image capturing optical systems. FIG. 7 explains a method of calculating the object distance, and illustrates the way of capturing an image of an object Obj located at one point in an image capturing scene using two image capturing optical systems CA and CB having the same configuration. Image sensors SA and SB respectively receive an object image (optical image) formed by the image capturing optical systems CA and CB. The centers of the entrance pupils in the image capturing optical systems CA and CB are located at (−D/2, 0) and (D/2, 0), and the object Obj is located at (x, z). Where f is a focal length of each of the image capturing optical systems CA and CB and a and b are coordinates of the object Obj in the image sensors SA and SB, the following expression (1) is established.

$$z = \frac{fD}{b-a} \quad (1)$$

In the expression (1), b-a is a positional shift on an image capturing plane in capturing an image of the same object from different viewpoints or a parallax. Once the parallax b-a (parallax amount) is obtained, a distance z (distance from the center of the entrance pupil in the image capturing optical system to the object Obj) can be calculated by substituting the parallax b-a, the focal length f and a baseline length D of each of the image capturing optical systems CA and CB for the expression (1).

Figure 8:
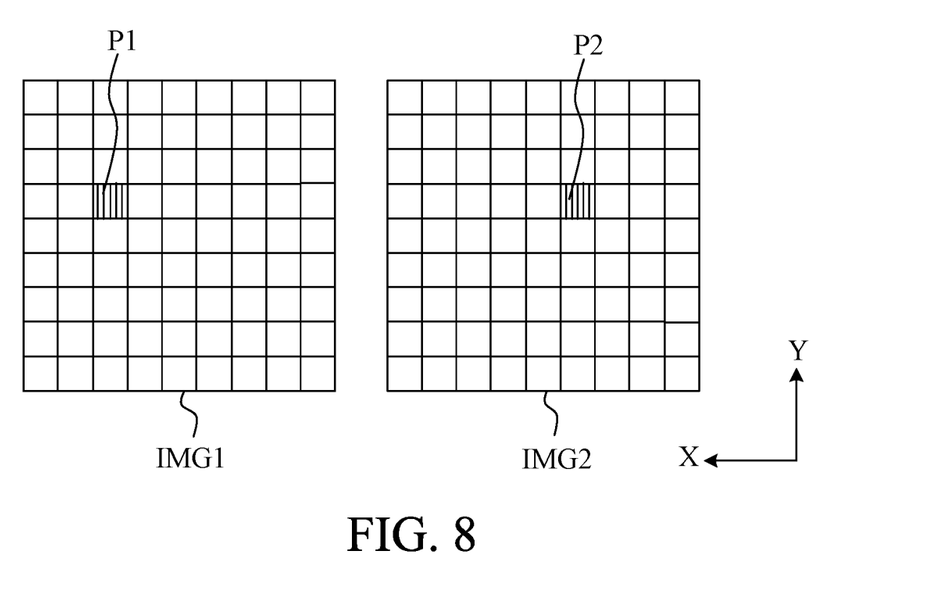
FIG. 8 explain corresponding object search processing in each embodiment.

Referring now to FIG. 8, a description will be given of a corresponding object search processing for acquiring the parallax amount based on the two images acquired using the two image capturing optical systems. FIG. 8 explains the corresponding object search processing, and illustrates images IMG1 and IMG2 captured from different viewpoints. An image coordinate (X, Y) is defined with the center of the pixels illustrated in FIG. 8 as the origin, where the horizontal direction is the X axis and the vertical direction is the Y axis. Assume that F1(X, Y) is a pixel value of the image IMG1 located at the image coordinate (X, Y), and F2(X, Y) is a pixel value of the image IMG2. A pixel of the image IMG2 corresponding to an arbitrary coordinate (X, Y) in the image IMG1 can be obtained by searching for a pixel value of the image IMG2 most similar to the pixel value F1(X, Y) of the image IMG1 located at the coordinate (X, Y). In the following description, the corresponding point on the image and the corresponding pixel have the same meaning.

Pixels P1 and P2 indicated by vertical lines on the images IMG1 and IMG2 illustrated in FIG. 8 are corresponding pixels (corresponding points) configured to record light from the same object. In general, it is difficult to find the pixel most similar to an arbitrary pixel, so similar pixels can be searched for using pixels near the image coordinate (X, Y) and a method called a block matching method.

For example, a description will be given of the block matching method with the block size of 3. Pixel values of totally three pixels including the pixel (addressed or target pixel) located at an arbitrary coordinate (X, Y) of the image IMG1 and two pixels located at coordinates (X−1, Y) and (X+1, Y) before and after the addressed pixel (target pixel) are F1(X, Y), F1(X−1, Y), and F1(X+1, Y), respectively. On the other hand, the pixel values of the pixels of the image IMG2 shifted by k in the X direction from the coordinate (X, Y) are F2(X+k, Y), F2(X+k−1, Y), F2(X+k+1, Y), respectively. Then, similarity E between the addressed pixel located at the coordinate (X, Y) of the image IMG1 and the pixel located at the coordinate (X+k, Y) of the image IMG2 is defined as in the following expression (2).

$$E = [F1(X, Y) - F2(X+k, Y)]^2 + [F1(X-1, Y) - F2(X+k-1, Y)]^2 + [F1(X+1, Y) - F2(X+k+1, Y)]^2 = \sum_{j=-1}^{1} [F1(X+j, Y) - F2(X+k+j, Y)]^2 \quad (2)$$

The coordinate (X+k, Y) that gives the smallest similarity E is the coordinate of the pixel of the image IMG2 corresponding to the addressed pixel of the image IMG1 by calculating the similarity E by successively changing the value of k in the expression (2). This embodiment calculates the similarity E by sequentially changing the coordinate only in the X direction, but may calculate the similarity E by sequentially changing the coordinate in the Y direction, or both in the X direction and the Y direction. This corresponding object search processing can provide the coordinate of a corresponding point (corresponding pixel) in the two images, and calculate a parallax amount as a difference amount between them.

While this embodiment has described the block matching method with the block size of 3, the search range and the block size are variable parameters in the above processing. Where the parallax amount is predictable to some extent, narrowing the search range to a certain area can significantly lessen the processing load and accelerate the processing speed. In general, the calculation accuracy of the parallax amount can be improved by setting the block size in accordance with the structure size of the object. In particular, when the image blurs, the calculation size of the parallax amount can be reduced by enlarging the block size based on the blur amount. One known method calculates the parallax amount at the subpixel level by linear fitting or parabola fitting for the similarity E. It is known that a subpixel calculation error in these fitting functions varies according to the sharpness of the image, and a function can be selected according to the sharpness of the image.

As described above, the corresponding object search processing to the two images acquired with the two image capturing optical systems can provide the parallax amount and the object distance can be calculated based on this parallax amount. The relationship between the parallax amount and the defocus amount as the image plane movement amount is determined according to the image capturing optical system. Therefore, the defocus amount can be calculated based on the parallax amount. The extension or protrusion amount of the lens can be obtained based on the defocus amount, and the lens can be moved and focused (phase difference AF). Hereinafter, this specification also expresses the object distance, the parallax amount, the defocus amount, or the phase difference information as distance information in the terms of information on the object distance.

Figure 9:
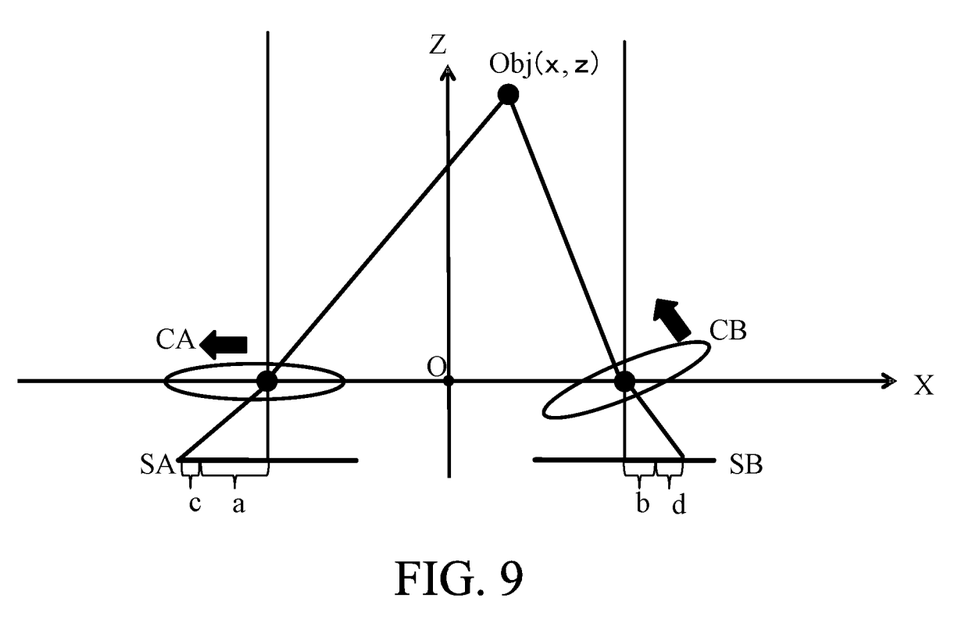
FIG. 9 explain a method of calculating an object distance when the image capturing optical system deforms in each embodiment.

In calculating an object distance z where an image of the object Obj located at (x, z) is captured using the image capturing optical systems CA and CB, it is assumed that the image of the object Obj is generated at the coordinates a and b which are always the same positions on image sensors SA and SB. This assumption condition is always satisfied when the image capturing optical systems CA and CB do not deform, otherwise this is not the case when the image capturing optical systems CA and CB deform. In an example, FIG. 9 schematically illustrates that the image capturing optical system CA illustrated in FIG. 7 is eccentric to the left and the image capturing optical system CB is tilted counterclockwise. In this state, when the image of the object Obj located at (x, z) is captured using the image capturing optical systems CA and CB, the coordinate of the image of the object Obj is located at a position of a+c in the image sensor SA and at a position of b+d in the image sensor SB. In other words, a change from the initial state in FIG. 7 to the state of FIG. 9 in which the image capturing optical system deforms shifts the image positions on the image sensors SA and SB by the image shift amounts c and d, respectively. As is apparent from the expression (1), since the image shift amounts c and d are added to the denominator, the value on the right side of the expression (1) has a value different from the object distance z. That is, the image shift amount caused by the deformation of the image capturing optical system causes an error in the calculation of the object distance z.

An image capturing apparatus according to this embodiment includes a plurality of image capturers, a first image capturer that includes an image capturing optical system including a focus detector configured to detect a focus (focus information) and a focus mechanism, and a second image capturer including at least one image capturing optical system. The image capturing apparatus further includes a distance information calculator configured to calculate distance information on a distance to the object based on at least two image signals obtained via the second image capturer. The image capturing apparatus further includes a correction value calculator configured to correct the distance information obtained via the second image capturer based on the focus information of the first image capturer output from the focus detector, and corrects a calculation error of the object distance. This configuration can control the focus mechanism so that the first image capturer focuses on the object based on the error corrected distance information, and accurately and quickly focuses on the object. The outline of the distance calculation method by the control apparatus according to this embodiment has been described so far. A detailed description will now be given the control apparatus (image capturing apparatus) in each embodiment.

First Embodiment

Figure 1A:
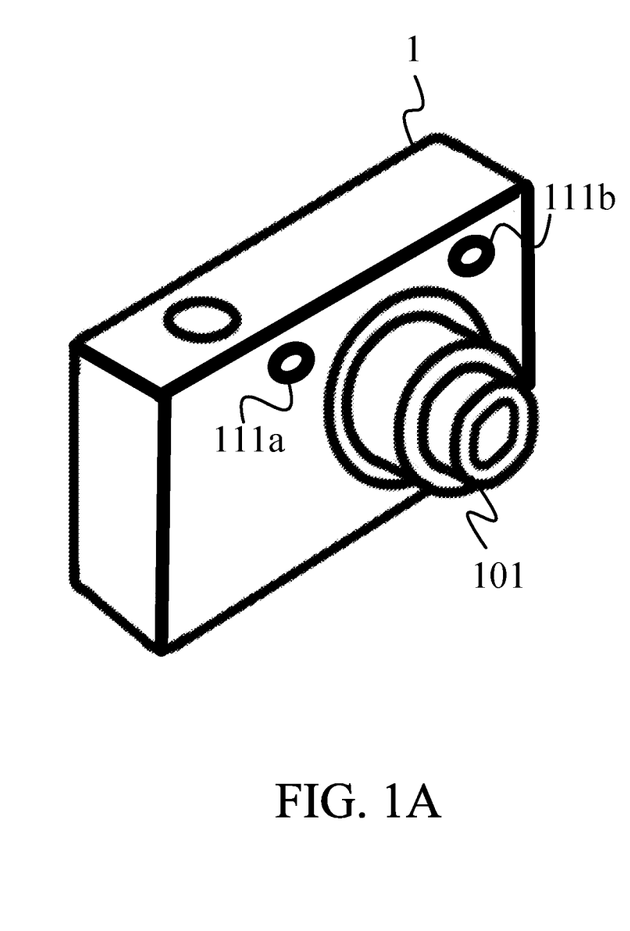
FIGS. 1A and 1B are overviews of an image capturing apparatus according to a first embodiment.
Figure 1B:
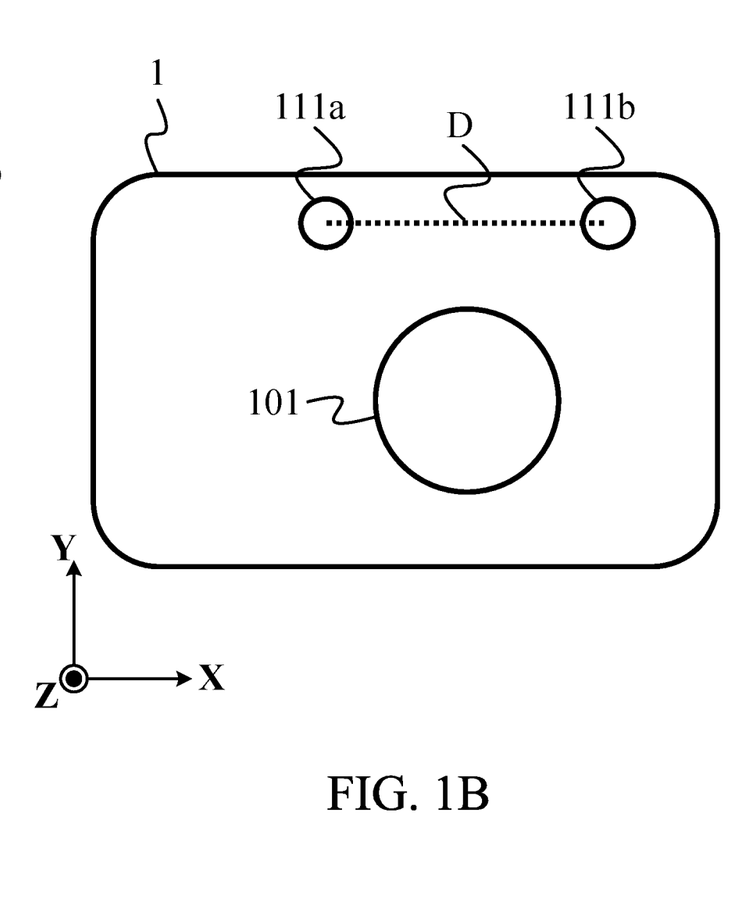
Figure 2:
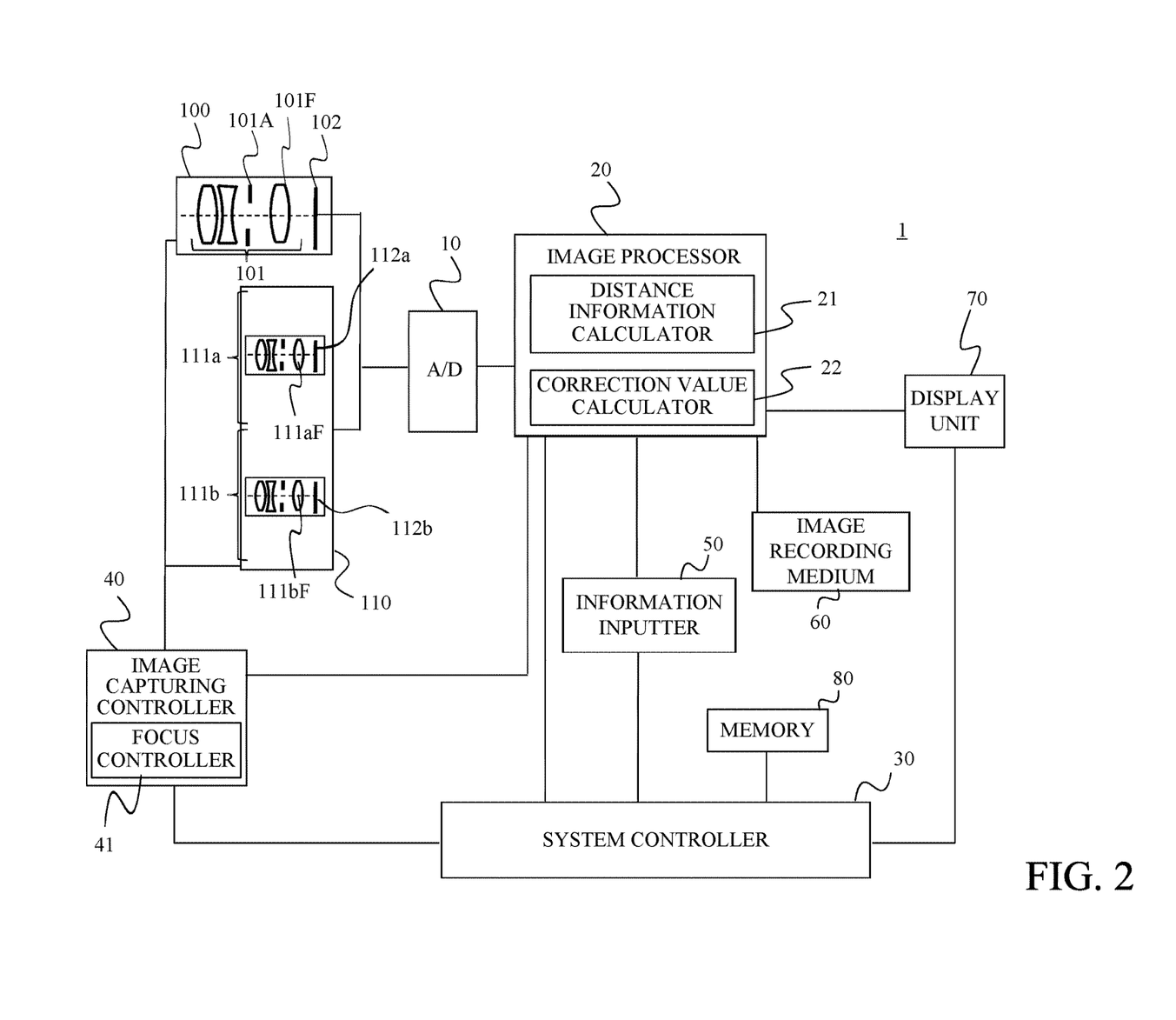
FIG. 2 is a block diagram of the image capturing apparatus according to the first embodiment.

Referring now to FIGS. 1A, 1B, and 2, a description will be given of the image capturing apparatus 1 (image capturing system) according to a first embodiment of the present invention. FIGS. 1A and 1B are overviews of the image capturing apparatus 1, FIG. 1A is a perspective view, and FIG. 1B is a front view. FIG. 2 is a block diagram of the image capturing apparatus 1.

The image capturing apparatus 1 includes a main image capturer (first image capturer) 100 used mainly to capture an image of an object, and a sub image capturer (second image capturer) 110 that acquires the object distance. The main image capturer 100 includes an image capturing optical system (first image capturing optical system) 101 and an image sensor 102. The image capturing optical system 101 includes one or more lenses, a diaphragm 101A, and a focus lens (focus mechanism) 101F, and focuses light from the unillustrated object on the image sensor 102. The image capturing optical system 101 is a magnification-varying optical system whose focal length is variable by driving one or more internal lenses.

In FIGS. 1A and 1B, the image capturing optical system 101 is configured as part of the image capturing apparatus 1, but may be an interchangeable image capturing optical system like a single-lens reflex camera. In other words, this embodiment is applicable to an image capturing apparatus in which the image capturing apparatus body including the image sensor 102 and the image capturing optical system 101 are integrated with each other, and an image capturing apparatus in which the image capturing optical system 101 is detachable (an image capturing system including an image capturing optical system 101 and an image capturing apparatus body).

The image sensor 102 is a solid-state image pickup element, such as a CMOS sensor or a CCD sensor, and photoelectrically converts an optical image (object image) formed via the image capturing optical system 101 to output an image signal (analog electrical signal). An image capturing controller 40 (focus controller 41) mechanically drives the diaphragm 101A and the focus lens 101F in the image capturing optical system 101 based on an instruction (control) from a system controller 30. The system controller 30 and the focus controller 41 constitute a controller. An aperture diameter in the diaphragm 101A is controlled according to the set aperture value (F-number). The focus controller 41 performs focusing by controlling the position of the focus lens 101F according to the object distance. The A/D converter 10 converts an analog electric signal (image signal) output from the image sensor 102 into a digital signal.

An image processor 20 performs so-called developing processing such as pixel interpolation processing, luminance signal processing, and color signal processing for a digital signal output from the A/D converter 10 to generate an image (image data). The image generated by the image processor 20 is recorded on an image recording medium 60, such as a semiconductor memory and an optical disc. The image generated by the image processor 20 may be displayed on a display unit 70. Various information is input to the information inputter 50 based on an instruction (operation) of the user. In an example, it is an image capturing condition (image capturing condition information) in acquiring the image such as an F-number and the ISO speed of the main image capturer 100, but it is not limited to this embodiment.

The sub image capturer (second image capturer) 110 includes an image capturing optical system (second image capturing optical system) 111a, an image capturing optical system (third image capturing optical system) 111b, and image sensors 112a and 112b corresponding to the image capturing optical systems 111a and 111b. Each of the image capturing optical systems 111a and 111b is a fixed-focal-length image capturing optical system that forms an image of light from an illustrated object on the image sensors 112a and 112b, and has an equal focal length. The image capturing optical systems 111a and 111b have focus lenses 111aF and 111bF, respectively. An analog electrical signal (image signal) generated by the image sensors 112a and 112b is output to the A/D converter 10 and converted into a digital signal in the same manner as in the image sensor 102.

The image processor 20 generates two images output from the image sensors 112a and 112b. These two images correspond to object images formed by the image capturing optical systems 111a and 111b, and are two parallax images having a parallax with each other. The image generated by the image processor 20 can be displayed on the display unit 70 as in the main image capturer 100. This embodiment displays an image obtained via the image capturing optical system (second image capturing optical system) 111a on the display unit 70, but the present invention is not limited to this embodiment. In this embodiment, the sub image capturer 110 may be detachable from the image capturing apparatus 1. Then, it is possible to select a sub image capturer suitable for the main image capturer 100 in the image capturing apparatus 1 from among the plurality of sub image capturers and to mount it to the image capturer in the image capturing apparatus 1.

The image processor 20 includes a distance information calculator (focus information calculator) 21 and a correction value calculator 22. The distance information calculator 21 calculates a parallax amount or an object distance based on the two parallax images (the two image signals output from the image sensors 112a and 112b) generated by the sub image capturer 110. The distance information calculator (focus information calculator) 21 calculates the evaluation value of the contrast AF based on the image (image signal) obtained through the main image capturer 100 and outputs the focus information (information on the focus position) (or calculates or obtains the focus information). In place of the contrast AF, the distance information calculator 21 may perform the phase difference AF or a hybrid AF in which the phase difference AF and the contrast AF and are combined. The distance information calculator 21 may calculate distance information or focus information of a specific area or a specific object specified by the user via the information inputter 50. For example, the information inputter 50 can select a specific object selected by the user as the distance information calculation area (focus detection area) and always set the specific object (moving object) as the distance information calculation area. It is also possible to calculate all object distances in the angle of field area overlapping each other among the angle of fields in the image capturing optical systems 111a and 111b and to generate a distance map image representing these distances as pixel values. The correction value calculator 22 calculates a correction value used to correct the distance information from the sub image capturer 110 based on the input focus information from the main image capturer 100 and distance information (parallax amount or object distance) from the sub image capturer 110. A memory 80 stores, as a table, data on the position (focus position) of the focus lens of the main image capturer 100 according to the distance information.

The image capturing apparatus 1 according to this embodiment includes one A/D converter 10 and one image processor 20 for the main image capturer 100 and the sub image capturer 110, but the present invention is not limited to this embodiment. For example, a dedicated A/D converter and an image processor (a plurality of A/D converters and a plurality of image processors) may be provided for each of the main image capturer 100 and the sub image capturer 110.

The image capturing optical systems 111a and 111b in the sub image capturer 110 are arranged so that a distance is 50 mm between the lenses closest to the object (lenses closest to the object), and this distance corresponds to a baseline D in the sub image capturer 110. The image capturing optical systems 111a and 111b have the same configuration and are arranged in parallel bilaterally symmetrical. In other words, the optical axes of the image capturing optical systems 111a and 111b are parallel to each other on the object side of the opening portions (aperture stops) of the image capturing optical systems 111a and 111b.

The two image capturing optical systems 111a and 111b in the sub image capturer 110 have the same angle of field. The angle of field of each of the image capturing optical systems 111a and 111b is wider than that at the telephoto end of the image capturing optical system 101 in the main image capturer 100. In this embodiment, the focal length of the image capturing optical system 101 in the main image capturer 100 at the telephoto end is 1000 mm in the 35 mm equivalent focal length, and the focal lengths of the two image capturing optical systems 111a and 111b in the sub image capturer 110 are 400 mm in the 35 mm equivalent focal length.

Each of the image sensors 112a and 112b in the sub image capturer has a size of about one half the size of the image sensor 102 in the main image capturer. Thus, a ratio of the actual focal length of the image capturing optical systems of the main image capturer and the sub image capturer is about five times, so that the depth of field of the sub image capturer is sufficiently deeper than that of the main image capturer.

Figure 3A:
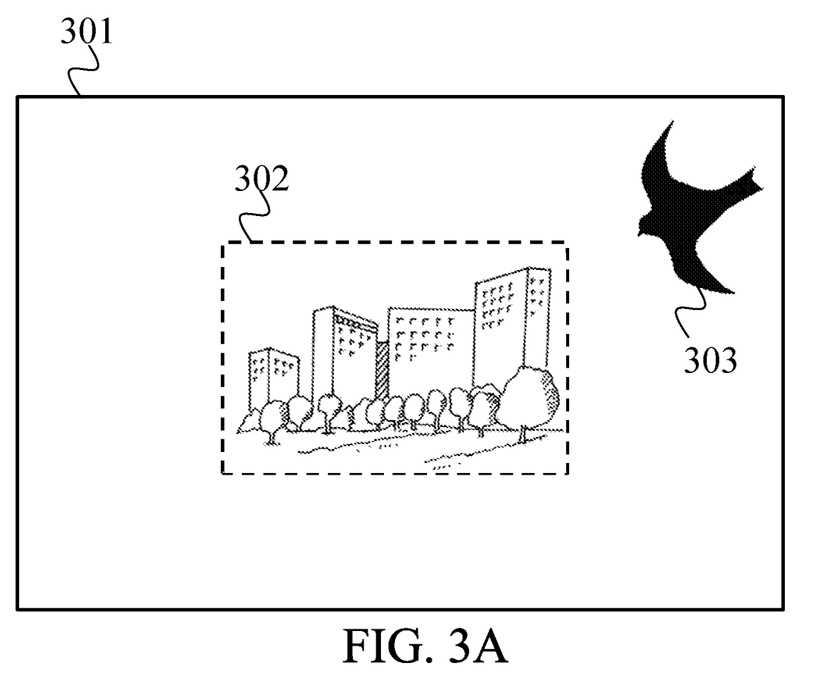
FIGS. 3A and 3B explain an image displayed on a display unit in each embodiment.
Figure 3B:
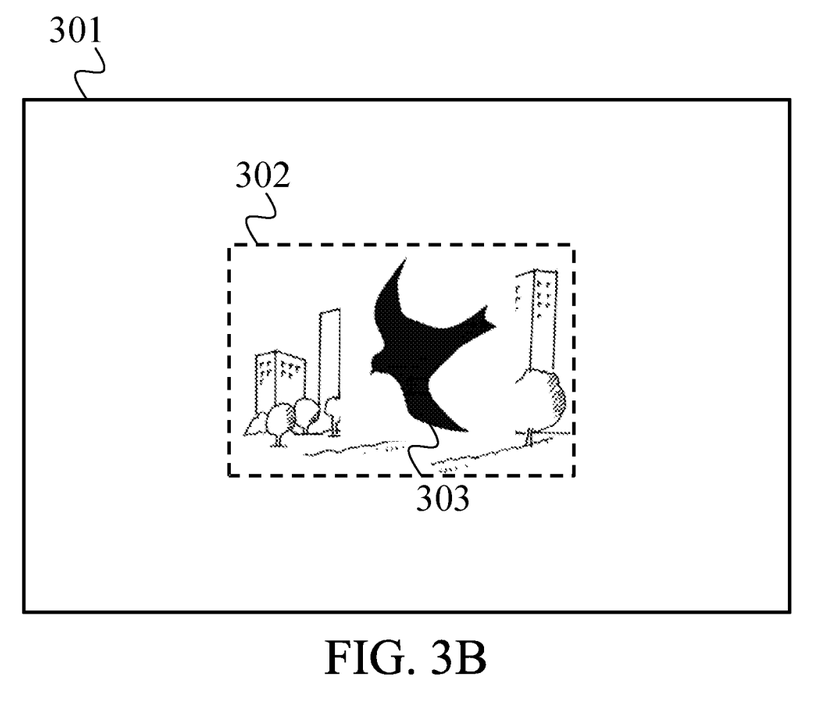

Referring now to FIGS. 3A and 3B, a description will be given of an image display example on the display unit 70 when the image capturing optical system 101 in the main image capturer 100 is set to the telephoto end. FIGS. 3A and 3B explain images displayed on the display unit 70, and illustrate images displayed on the display unit 70 in capturing an image of an object 303 (bird). FIG. 3A illustrates that the object 303 is located outside the image capturing visual field range of the main image capturer 100, and FIG. 3B illustrates that the object 303 is located within the image capturing visual field range of the main image capturer 100, respectively.

An area enclosed by a solid line 301 in FIG. 3A is an image capturing visual field (image capturing visual field range) of the image capturing optical system 111a of the sub image capturer 110. Thus, the display unit 70 displays an image captured via the image capturing optical system 111a in the sub image capturer 110. An area enclosed by a broken line 302 in FIG. 3A indicates an image capturing visual field (image capturing visual field range) of the main image capturer 100. The user can confirm the image capturing visual field of the main image capturer 100 by the broken line 302 (information on the image capturing visual field of the main image capturer 100) displayed on the display unit 70.

In FIG. 3A, the object 303 (bird) to be captured is not located within the image capturing visual field range of the main image capturer 100 (is located outside of the image capturing visual field range of the main image capturer 100) but is located within the image capturing visual field range of the image capturer 110. The display unit 70 according to this embodiment superimposes and displays information (broken line 302) on the image capturing visual field of the main image capturer 100 on the image obtained via the sub image capturer 110. Therefore, the user can easily capture the object within the image capturing visual field, for example, in the telephoto imaging. Since the angle of field of the sub image capturer 110 is wider than that at the telephoto end of the main image capturer 100, it is easy to capture the object in the telephoto imaging using the magnification-varying optical system. The sub image capturer 110 may have an angle of field that is twice or more as wide as that at the telephoto end of the main image capturer 100. Due to the double or more focal length ratio (angle of field ratio) between the main image capturer 100 and the sub image capturer 110 described above, the object can be more easily captured.

The display unit 70 according to this embodiment displays the broken line 302 for allowing the user to recognize the visual field range of the main image capturer 100 as the information on the image capturing visual field of the main image capturer 100, but this embodiment is not limited to this example. For example, the display unit 70 may combine and display the image obtained via the main image capturer 100 on the image obtained via the sub image capturer 110 (may combine and display the image obtained via the main image capturer 100 on the area enclosed by the broken line 302). Due to this composite display, the user can easily recognize the final image captured by the main image capturer 100.

Figure 4:
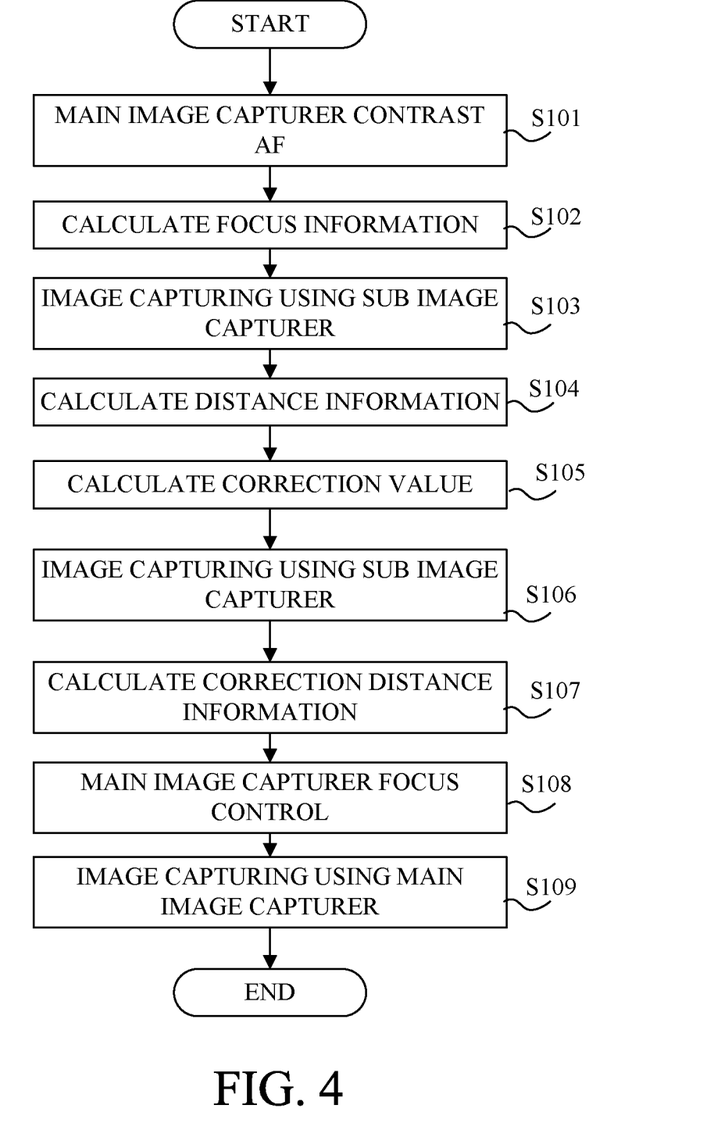
FIG. 4 is a flowchart illustrating an operation of the image capturing apparatus according to the first embodiment.

Referring now to FIG. 4, a description will be given of an image capturing procedure of the image capturing apparatus 1. FIG. 4 is a flowchart illustrating the operation (image capturing operation) of the image capturing apparatus 1. Each step in FIG. 4 is mainly executed by each component in the image capturing apparatus 1 based on a command from the system controller 30.

First, in the step S101, the system controller 30 performs the contrast AF (focus detection processing) using the main image capturer 100 via the image capturing controller 40. More specifically, the system controller 30 controls the main image capturer 100 via the image capturing controller 40 and acquires a pre-image by capturing an image. Now assume that an image of building in the area enclosed by the broken line 302 illustrated in FIG. 3A is being captured. The information inputter (area selector) 50 determines part of an arbitrary building in the area enclosed by the broken line 302 as a focus detection area. The system controller 30 supplies only the image signal within the focus detection area determined by the information inputter 50 to the distance information calculator 21. Then, the system controller 30 acquires the AF evaluation value generated by the distance information calculator 21 based on the image signal within the focus detection area.

The system controller 30 wobbles the focus lens 101F to the left and right by a very small amount and again obtains the AF evaluation value (the AF evaluation value obtained by moving the focus lens 101F to the left and the AF evaluation value obtained by moving the focus lens 101F to the right). The system controller 30 performs the contrast AF on the basis of the AF evaluation value obtained by this fine driving and determines the position (focus position) of the focus lens 101F. As a preliminary step of the step S101, the system controller 30 may determine whether or not to perform the image capturing operation according to the flowchart illustrated in FIG. 4. This determination can also be made based on a determination as to whether or not a deformation factor of the optical system has been detected based on a temperature measurement result by an unillustrated temperature detector and a vibration amount measurement result by a vibration detector.

Next, in the step S102, the image processor 20 (distance information calculator 21) calculates the focus information for the object in the focus detection area based on the position of the focus lens 101F determined in the step S101. The position of the focus lens 101F for a certain object distance is uniquely determined in the image capturing optical system (image capturing optical system). In other words, the position of the focus lens 101F for focusing the image on the image sensor surface for a certain object distance in the image capturing optical system 101 always maintains a relative relationship. Hence, once the position of the focus lens 101F in the image capturing optical system 101 is determined for a certain object distance, the object distance information (focus information) can be calculated based on the relative relationship.

This embodiment stores, as a lookup table, data representing the above relative positional relationship (the relationship between the focus position and the object distance information), for example, in the memory 80. The object distance information corresponding to the focus position can be calculated based on the lookup table and the stop position information (focus position) of the focus lens 101F determined in the previous stage. An alternative method may store the above relative relationship as a function in the memory 80, and calculate the object distance information corresponding to the focus position based on the function and the stop position information (focus position) of the focus lens 101F determined in the previous stage. The object distance information stored as the lookup table is not limited to the distance to the object but may be the parallax amount or the defocus amount obtained from the sub image capturer 110 in a normal state.

Next, in the step S103, the system controller 30 controls the sub image capturer 110 via the image capturing controller 40 and acquires two images by capturing an image. Next, in the step S104, the image processor 20 (distance information calculator 21) calculates object distance information in the focus detection area based on the two images acquired in the step S103. In this embodiment, the image processor 20 calculates the distance information of part of the buildings in the area enclosed by the broken line 302 in FIG. 3A which is the target of the contrast AF in the step S101. The memory 80 stores information necessary to calculate the object distance information, such as the focal length and the baseline length of the two image capturing optical systems 111a and 111b in the sub image capturer 110 and the pixel size of the image sensors 112a and 112b. The image processor 20 can receive the information from the memory 80, if necessary. This embodiment calculates the object distance using the two-dimensional image, as described above, the defocus amount may be calculated using the conventional phase difference AF method. In this embodiment, the image capturing optical systems 111a and 111b in the sub image capturer 110 deform as described with reference to FIG. 9 due to the temperature fluctuation. In other words, the distance information contains a calculation error of the object distance due to the image shift amount caused by the deformation of the image capturing optical system.

Next, in the step S105, the image processor 20 (correction value calculator 22) calculates a correction value based on the focus information calculated in the step S102 and the distance information calculated in the step S104. In the normal state, the correlation is constant between the focus information of the main image capturer 100 and the distance information of the sub image capturer 110. On the other hand, when the sub image capturer 110 is in the state as illustrated in FIG. 9, the distance information varies due to the image shift amount. In this embodiment, the correction value calculator 22 calculates a correction value c+d for the sub image capturer 110.

Next, in the step S106, the system controller 30 controls the sub image capturer 110 via the image capturing controller 40 and acquires the two images again by capturing an image. In the step S106, as illustrated in FIG. 3B, the object (main object) 303 is located in the image capturing visual field range of the main image capturer 100 enclosed by the broken line 302. The system controller 30 sets the object selected by the user via the information inputter 50 as the addressed object. As illustrated in FIGS. 3A and 3B, when the user touches the object (bird) 303 on the image displayed on the display unit 70, the object 303 is selected as or set to the addressed object (focus detection area). The object detected by the known moving object detection or object recognition technique may also be set to the addressed object. Due to this setting, even for the addressed object located outside the image capturing visual field range of the main image capturer 100 (outside the area enclosed by the broken line 302), the correction value can be calculated in the step S105.

Next, in the step S107, the distance information calculator 21 calculates the corrected distance information (corrected distance information) based on the two captured images acquired again in the step S106 and the correction value calculated in the step S105. The memory 80 stores information necessary to calculate the object distance, such as the focal length and baseline length of the two image capturing optical systems 111a and 111b in the image capturer 110 and the pixel size of the image sensors 112a and 112b. The distance information calculator 21 can receive the information from the memory 80, if necessary.

The distance information calculator 21 calculates the parallax amount of each object based on the two captured images by the above corresponding object search processing. As illustrated in FIG. 9, the parallax amount calculated from the two images captured by the deforming image capturing optical system contains an error according to the image shift amount. In an example, in this embodiment, the calculated parallax amount is (a+c+b+d) and the correct parallax amount is (a+b). Thus, if the object distance is calculated from the expression (1) using the parallax amount as it is, the distance information contains an error of the image shift amount (c+d). Accordingly, in this embodiment, the error of the distance information caused by the image shift amount can be reduced by subtracting the image shift amount from the calculated parallax amount based on the correction value corresponding to the image shift amount calculated in the step S105.

Next, in the step S108, the system controller 30 drives the focus lens 101F in the main image capturer 100 via the focus controller 41 and performs the focus control over the main image capturer 100 so as to focus the image capturing optical system 101 on the main object. Then, the system controller 30 controls the focusing of the main image capturer 100 based on the corrected distance information (the distance information calculated in the step S104 and the correction value calculated in the step S105) calculated in the step S107. The memory 80 stores as a look-up table the position (focus position) of the focus lens 101F according to the object distance information. Hence, the focus position corresponding to the object distance information can be properly determined according to the image capturing condition of each image capturer and the object distance information. The system controller 30 can accurately perform the focus control for the main object by the focus control over the main image capturer 100 based on the corrected distance information by the corrected sub image capturer 110. This configuration can shorten the focus control time (or provide the high-speed focus control) after the main object has entered the image capturing visual field of the main image capturer 100 and reduce the frequency of capturing the blurred image. As a result, the success rate of capturing a moving object can be improved with a telephoto lens.

Next, in the step S109, the system controller 30 controls the main image capturer 100 via the image capturing controller 40, captures and acquires an image. This image is stored in the image recording medium 60, and the image capturing procedure illustrated in FIG. 4 ends. In addition to this image, two images acquired by the sub image capturer 110 may be stored in the image recording medium 60. The distance map image calculated by the image processor 20 using two images may be stored in the image recording medium 60. In this embodiment, the distance information calculator 21 can output a contrast AF evaluation value (contrast evaluation value) according to an image via the main image capturer 100. The focus controller 41 can perform the final focus control of the main image capturer 100 based on the contrast evaluation value. Then, due to the follow-up control from the substantially in-focus state, even the contrast AF increases only a slight control time, providing the high-speed AF control.

Thus, the control apparatus (image capturing apparatus 1) according to this embodiment includes a distance information calculator (focal distance calculator) 21, a correction value calculator 22, and a controller (system controller 30 and focus controller 41). The distance information calculator (focal distance calculator) 21 calculates or acquires the focus information based on the image signal obtained via the first image capturer (main image capturer 100). The distance information calculator 21 calculates the distance information on the distance to the object based on the image signal obtained via the second image capturer (sub image capturer 110). The correction value calculator 22 calculates a correction value based on the focus information of the first image capturer. The controller performs the focus control over the first image capturer based on the correction value and the distance information.

The correction value may be a correction value (correction coefficient) for correcting the distance information (the coefficient of the distance information calculating expression). The correction value is a correction value for correcting data (look-up table) indicating the relationship between the focus information and the distance information. The correction value calculator 22 may further calculate a correction value based on the distance information. The focus information may be information on the position (focus position) of the focus lens 101F in the first image capturer. After the first focus control over the first image capturer based on the correction value and the distance information, the controller may perform the second focus control (follow-up control) of the first image capturer based on the focus information. The second focus control is the focus control based on the contrast AF. The distance information calculator 21 calculates the distance information based on the parallax amount of the two image signals obtained via the second image capturer.

This configuration can improve the distance calculation accuracy even when the image shifts due to the displacement or deformation of the optical system. The main object of this embodiment is the focus control (focus control) over the main image capturer. It is therefore unnecessary to accurately calculate the absolute object distance, as long as the relative relationship of the distance information between the main image capturer and the sub image capturer is corrected. This embodiment can maintain the relative relationship of the distance information between the main image capturer and the sub image capturer through thee above configuration and can achieve the object of the present invention, even when the optical system of the main image capturer shifts due to the displacement or deformation.

Second Embodiment

Figure 5:
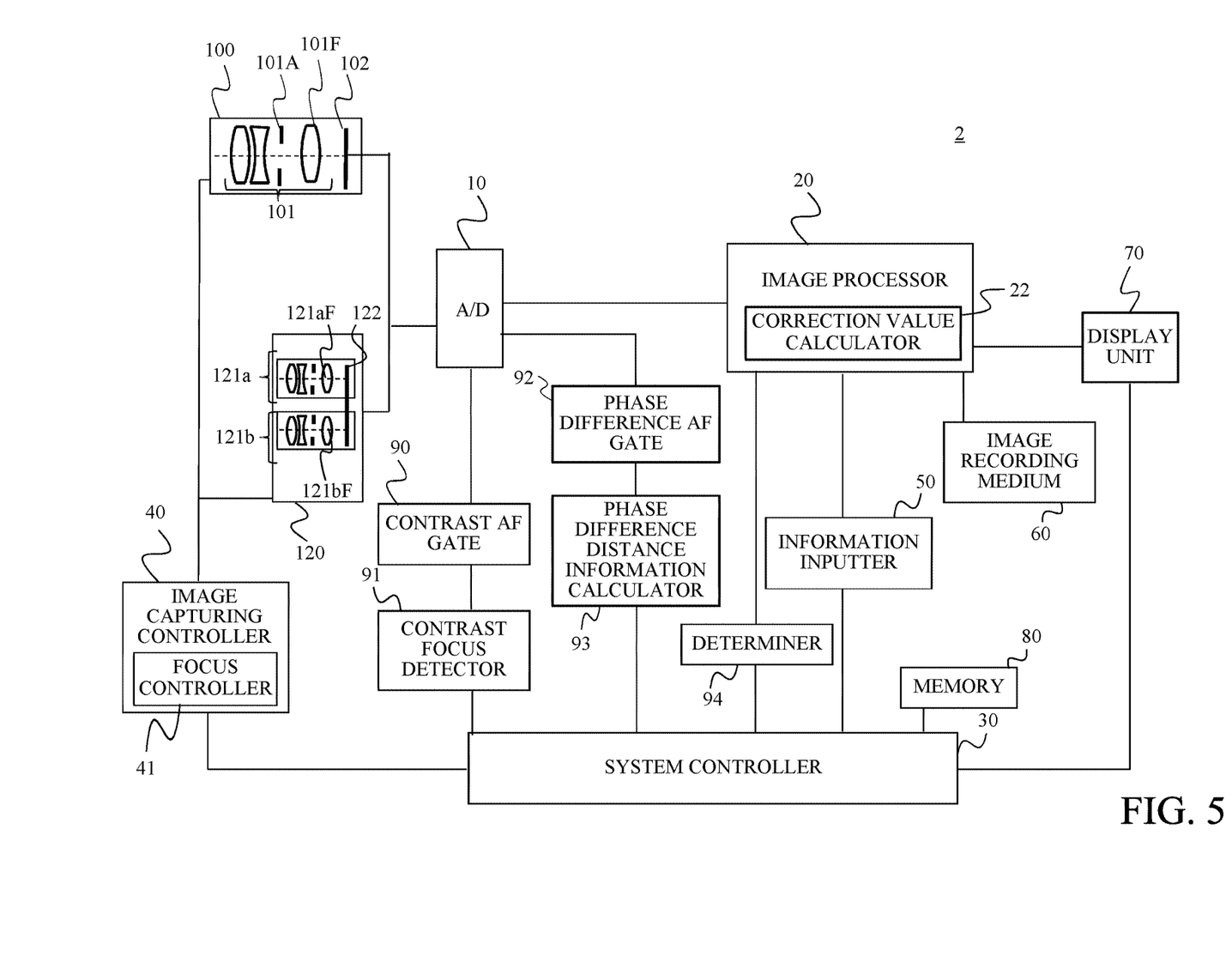
FIG. 5 is a block diagram of an image capturing apparatus according to a second embodiment.

Referring now to FIG. 5, a description will be given of an image capturing apparatus (image capturing system) 2 according to a second embodiment of the present invention. FIG. 5 is a block diagram of the image capturing apparatus 2. The image capturing apparatus 2 according to this embodiment is different from the image capturing apparatus 1 according to the first embodiment in having a sub image capturer 120 instead of the sub image capturer 110. The image capturing apparatus 2 is also different from the image capturing apparatus 1 in having a contrast AF gate 90, a phase difference AF gate 92, a contrast focus detector (focus information calculator) 91, a phase difference distance information calculator (distance information calculator) 93, a determiner 94. Since other configurations of the image capturing apparatus 2 are the same as those of the image capturing apparatus 1, a description thereof will be omitted.

The sub image capturer (second image capturer) 120 includes image capturing optical systems 121a and 121b and an image sensor 122. Each of the image capturing optical systems 121a and 121b is a fixed-focal-length image capturing optical system that forms an image of light from an object (not shown) on the image sensor 122, and has an equal focal length. The analog electrical signal output from the image sensor 122 is handled similarly to the analog electrical signal output from the image sensor 102. The image processor 20 generates two images based on image signals (image signals obtained via the image capturing optical systems 121a and 121b) output from the image sensor 122. These two images correspond to object images formed by the image capturing optical systems 121a and 121b, and are two parallax images having a parallax with each other. In this embodiment, the sub image capturer 120 may be detachable from the image capturing apparatus 2. Then, a sub image capturer suitable for the main image capturer 100 in the image capturing apparatus 2 may be selected from among the plurality of sub image capturers and mounted onto the image capturing apparatus 2.

Unlike the sub image capturer 110 according to the first embodiment, the sub image capturer 120 has a single image sensor 122 common to the two image capturing optical systems 121a and 121b. An image is formed on a single image sensor 122 via two image capturing optical systems 121a and 121b, and an image signal is output from the image sensor 122. This embodiment can reduce the number of image sensors and thus the cost as compared with the configuration according to the first embodiment. In this embodiment, the focal length at the telephoto end of the image capturing optical system 101 in the main image capturer 100 is 1000 mm in the 35 mm equivalent focal length, and the focal length of the two image capturing optical systems 121a and 121b in the sub image capturer 120 is 400 mm in the 35 mm equivalent focal length.

The image sensor 122 in the sub image capturer 120 is as large as the image sensor 102 in the main image capturer 100. Since the image capturing area of the image sensor 122 is divided into two and used in the sub image capturer 120, the substantial image sensor size for the image capturing optical systems 121a and 121b in the sub image capturer 120 becomes halved. Since the ratio of the actual focal length of the image capturing optical system between the main image capturer 100 and the sub image capturer 120 is approximately five times, the depth of field of the sub image capturer 120 is sufficiently deeper than that of the main image capturer 100.

The A/D converter 10 converts an analog electric signal (image signal) output from each of the image sensors 102 and 122 into a digital signal and supplies it to the image processor 20 or the contrast AF gate 90. The contrast AF gate 90 selects only the signal within the range of the focus detection area (AF frame) set by the user via the information inputter 50 among all pixel output signals from the A/D converter 10 and supplies it to the contrast focus detector 91. The contrast focus detector 91 applies a filter to the image signal (focus signal) supplied from the contrast AF gate 90, extracts a high frequency component, and generates an evaluation value (AF evaluation value). The AF evaluation value is output to the system controller 30.

The phase difference AF gate 92 selects only the signal of the focus detection area (AF frame) set by the user via the information inputter 50 among all pixel output signals from the A/D converter 10 and supplies it to the phase difference distance information calculator 93. The phase difference distance information calculator 93 performs phase difference processing (focus detection processing) for the image signal (focus signal) supplied from the phase difference AF gate 92 and calculates the defocus amount. The defocus amount is output to the system controller 30.

The determiner 94 determines whether or not a correction value is to be calculated. This determination can be made based on a determination as to whether or not a deformation factor of the optical system has been detected based on a temperature measurement result by an unillustrated temperature detector and a vibration amount measurement result by a vibration detector.

Figure 6:
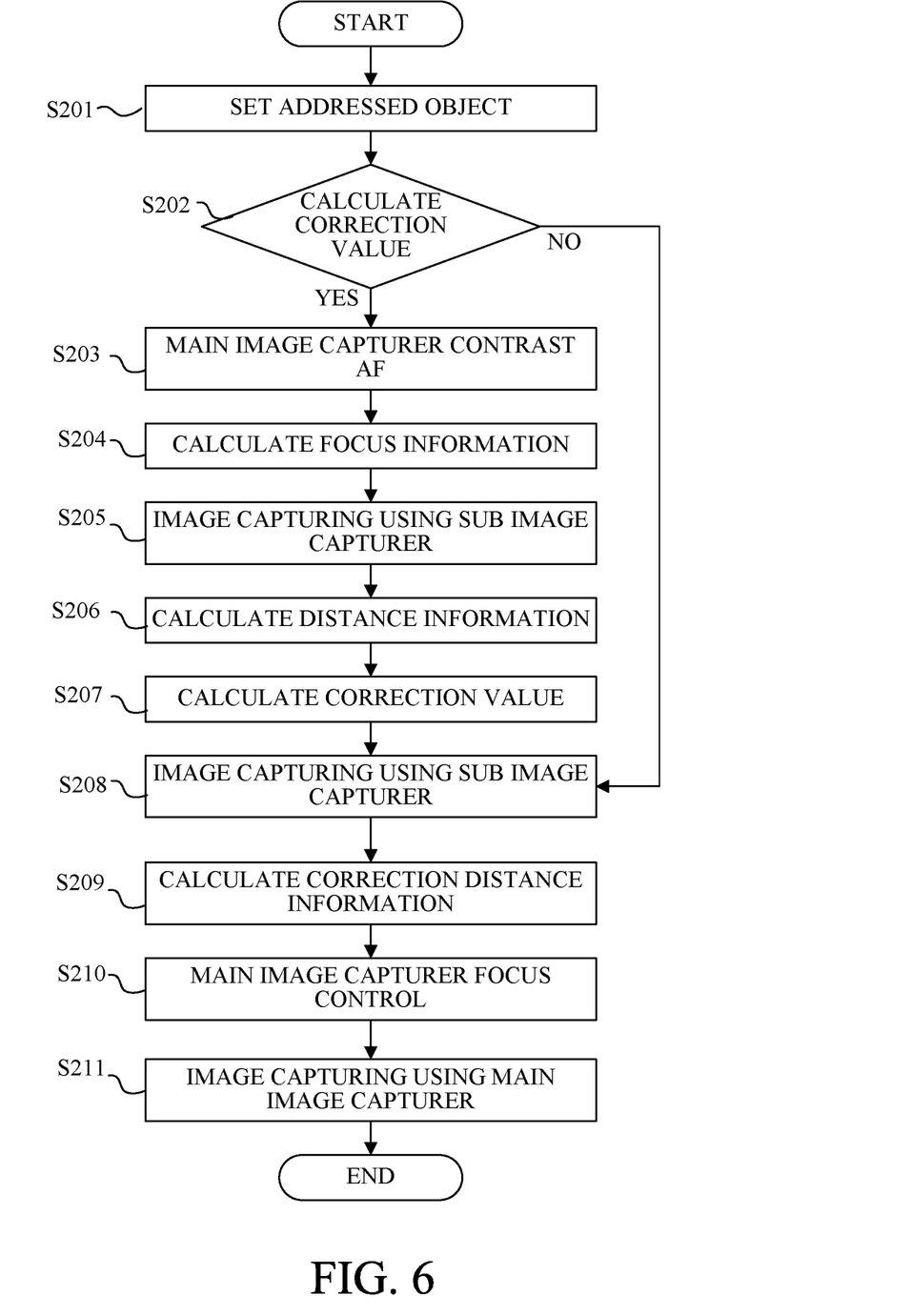
FIG. 6 is a flowchart illustrating an operation of the image capturing apparatus according to the second embodiment.

Referring now to FIG. 6, a description will be given of an image capturing procedure of the image capturing apparatus 2. FIG. 6 is a flowchart illustrating the operation (image capturing operation) of the image capturing apparatus 2. Each step in FIG. 6 is mainly executed by each component in the image capturing apparatus 2 based on a command from the system controller 30.

First, in the step S201, the system controller 30 sets the object selected by the user via the information inputter 50 to the addressed object. As illustrated in FIG. 3A, the user selects the object 303 (bird) on the image displayed on the display unit 70 using the selection button (not shown) by the user. The system controller 30 acquires an image capturing condition (image capturing condition information) input by the user via the information inputter 50. The image capturing condition includes the F-number of the main image capturer 100, the ISO speed, and the like, but the present invention is not limited to them. The system controller 30 controls the diaphragm 101A and the image sensor 102 in the main image capturer 100 via the image capturing controller 40, and sets the acquired image capturing condition.

Next, in the step S202, the determiner 94 determines whether or not a correction value is to be calculated. When it is determined in the step S202 that the determiner 94 that the correction value is to be calculated (YES), the flow proceeds to the step S203. On the other hand, when the determiner 94 determines that the correction value is not to be calculated (NO), the flow proceeds to the step S208. This determination can be made based on a determination as to whether or not a deformation factor of the optical system has been detected based on the temperature measurement result by the temperature detector (not shown) and the vibration amount measurement result by the vibration detector. It may have a timer function for causing the correction value to be calculated at regular time intervals. When the sub image capturer 120 is attachable to and detachable from the image capturing apparatus body, the determiner 94 may provide a control so as to calculate a correction value when the sub image capturer 120 is initially attached to the image capturing apparatus body.

In the step S203, the system controller 30 performs the contrast AF of the main image capturer 100 via the image capturing controller 40. More specifically, the system controller 30 controls the main image capturer 100 via the image capturing controller 40, captures and acquires a pre-image. FIG. 3A illustrates the image capturing state in the step S203. As illustrated in FIG. 3A, the object (main object) 303 is located outside the image capturing visual field area enclosed by the broken line 302 of the main image capturer 100, and captures an image of only the building in the area enclosed by the broken line 302. Accordingly, the information inputter (area selector) 50 sets part of an arbitrary building in the area enclosed by the broken line 302 to the correction value calculation focus detection area. In other words, when the addressed object determined in the previous step S201 is located outside the image capturing visual field of the main image capturer 100, a different object can be separately reset to the focus detection area for calculating the correction value. This setting can calculate a correction value at the subsequent stage even when the addressed object is located outside the image capturing visual field of the main image capturer. The contrast AF gate 90 is set so that only the image signal within the determined focus detection area is supplied to the contrast focus detector 91.

Then, the system controller 30 acquires the AF evaluation value generated by the contrast focus detector 91 based on the image signal within the focus detection area for calculating the correction value. The system controller 30 wobbles the focus lens 101F to the left and right by a very small amount and again obtains the AF evaluation value (the AF evaluation value obtained by moving the focus lens 101F to the left and the AF evaluation value obtained by moving the focus lens 101F to the right). The system controller 30 performs the contrast AF on the basis of the AF evaluation value obtained by this fine driving and determines the position (focus position) of the focus lens 101F.

Next, in the step S204, the contrast focus detector 91 calculates the focus information for the object in the focus detection area for calculating the correction value using the position of the focus lens 101F determined in the step S203. The position of the focus lens 101F for a certain object distance is uniquely determined in the image capturing optical system. In other words, for the image capturing optical system 101, the position of the focus lens 101F for focusing the image on the image sensor surface for a certain object distance always maintains a relative relationship. Hence, once the position of the focus lens 101F in the image capturing optical system 101 for a certain object distance is determined, the object distance information can be calculated based on the relative relationship. The method of calculating the object distance information is the same as that in the first embodiment.

Next, in the step S205, the system controller 30 controls the sub image capturer 120 via the image capturing controller 40 and acquires two images by capturing an image. Next, in the step S206, the phase difference distance information calculator 93 calculates the object distance information in the focus detection area for calculating the correction value, based on the two images acquired in the step S205. This embodiment calculates the distance information on part of the buildings in the area enclosed by the broken line 302 in FIG. 3A which was a target of the contrast AF in the step S203. The phase difference distance information calculator 93 calculates the defocus amount by the above corresponding object search processing. When a plurality of lines are used as data, for example, corresponding object search processing can also be performed for each corresponding line and the average of the obtained correlation values can be obtained. Prior to the corresponding object search processing, a plurality of line data may be averaged in the vertical direction, and the corresponding object search processing may be performed as data of one line.

The system controller 30 acquires the defocus amount calculated based on the image signal within the focus detection area for calculating the correction value calculated by the phase difference distance information calculator 93. In this embodiment, the image capturing optical systems 121a and 121b in the sub image capturer 120 deform in the same manner as in FIG. 9 due to the temperature variation. In other words, the distance information contains a calculation error of the object distance due to the image shift amount caused by the deformation of the optical system.

Next, in the step S207, the correction value calculator 22 calculates a correction value based on the focus information calculated in the step S204 and the distance information calculated in the step S206. In a normal state, the correlation is constant between the focus information of the main image capturer 100 and the distance information of the sub image capturer 120. On the other hand, when the sub image capturer 120 is in the state illustrated in FIG. 9, the distance information varies due to the image shift amount. In this embodiment, the correction value calculator 22 calculates a correction value c+d for the sub image capturer 120.

In the step S208, the system controller 30 controls the sub image capturer 120 via the image capturing controller 40 and acquires the two images again by capturing an image. In the step S208, as illustrated in FIG. 3B, the object (main object) 303 is located in the image capturing visual field area of the main image capturer 100 enclosed by the broken line 302. The system controller 30 sets the object (main object) selected by the user via the information inputter 50 in step S201 to the addressed object (focus detection area).

Next, in the step S209, the phase difference distance information calculator 93 calculates the corrected distance information (the defocus amount) based on the two captured images acquired again in the step S208 and the correction values calculated in the step S207. The memory 80 stores information necessary to calculate the defocus amount, such as the focal length and the baseline length of the two image capturing optical systems 121a and 121b in the sub image capturer 120, and the pixel size of the image sensor 122. The phase difference distance information calculator 93 can receive the information from the memory 80, if necessary.

The phase difference distance information calculator 93 calculates the parallax amount of each object from the two captured images by the above corresponding object search processing. As illustrated in FIG. 9, the parallax amount calculated from the two images captured with the deforming image capturing optical system contains an error according to the image shift amount. In an example, in this embodiment, the calculated parallax amount is (a+c+b+d) and the correct parallax amount is (a+b). Thus, when the object distance is calculated from the expression (1) using the parallax amount as it is, the distance information contains an error of the image shift amount (c+d). Accordingly, this embodiment subtracts the image shift amount from the calculated parallax amount based on the correction value corresponding to the image shift amount calculated in the step S207, and reduces the error of the distance information caused by the image shift amount.

Next, in the step S210, the system controller 30 drives the focus lens 101F in the main image capturer 100 via the focus controller 41 and performs the focus control of the main image capturer 100 so as to focus the image capturing optical system 101 on the main object. Then, the system controller 30 controls the focusing of the main image capturer 100 based on the correction distance information (the distance information calculated in the step S206 and the correction value calculated in the step S207) calculated in the step S209. The memory 80 stores as a look-up table the position (focus position) of the focus lens 101F according to the object distance information. Hence, the focus position corresponding to the object distance information can be properly determined according to the image capturing condition and the object distance information of each image capturer. The system controller 30 can perform the accurate focus control on the main object by the focus control over the main image capturer 100 based on corrected distance information by the sub image capturer 110. This configuration can shorten the focus control time (perform the high-speed focus control) after the main object enters the image capturing visual field of the main image capturer 100 and reduce the frequency of capturing a blurred image. As a result, the success rate of capturing an image of a moving object using a telephoto lens improves.

Next, in the step S211, the system controller 30 controls the main image capturer 100 via the image capturing controller 40, captures and acquires an image. This image is stored in the image recording medium 60, and the image capturing procedure illustrated in FIG. 6 ends. In addition to this image, two images acquired by the sub image capturer 110 may be stored in the image recording medium 60. The distance map image calculated by the image processor 20 using two images may be stored in the image recording medium 60. In this embodiment, the contrast focus detector 91 can output the contrast AF evaluation value (contrast evaluation value) again according to the image via the main image capturer 100. The focus controller 41 can perform the final focus control over the main image capturer 100 based on the contrast evaluation value. In this case, due to the follow-up control from the substantially in-focus state, even the contrast AF increases only a slight control time, providing the high-speed AF control.

Hence, in this embodiment, the control apparatus (image capturing apparatus 2) may include the determiner 94 configured to determine whether or not the correction value is to be calculated, and the correction value calculator 22 calculates the correction value when the determiner 94 determiner that the correction value is to be calculated. The control apparatus may have an area selector (information inputter 50) configured to select an area for calculating the focus information, and the focus information calculator (contrast focus detector 91) calculates the focus information in the area selected by the area selector. When selecting as the area the first area located outside the image capturing visual field of the first image capturer, the area selector sets the second area located within the image capturing visual field of the first image capturer to the area used to calculate the correction value. When selecting as the area the first area located within the image capturing visual field of the first image capturer, the area selector sets the first area to the area used to calculate the correction value. This configuration can improve the distance calculation accuracy even when the image shifts due to the displacement or deformation of the optical system.

In each embodiment, the sub image capturer (second image capturer) has a plurality of image capturing optical systems (stereo optical systems), but the present invention is not limited to this embodiment. For example, the sub image capturer includes a single image capturing optical system (only the second image capturing optical system), and an image sensor that includes a first photoelectric converter and a second photoelectric converter that receive light passing different pupil areas in the image capturing optical system. The image sensor having this function includes, for example, a plurality of photoelectric converters (a first photoelectric converter and a second photoelectric converter), and a plurality of two-dimensionally arranged micro lenses, each of which is provided to the plurality of photoelectric converters.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can provide a control apparatus, an image capturing apparatus, a control method, and a storage medium, which can provide an accurate and high-speed focus control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-53733, filed on Mar. 22, 2018 which is hereby incorporated by reference herein in its entirety.

What is claimed is:

1. A control apparatus comprising:
   a focus information calculator configured to calculate focus information by using an image signal obtained via a first image capturer;
   a distance information calculator configured to calculate distance information on a distance to an object by using an image signal obtained via a second image capturer;
   a correction value calculator configured to calculate a correction value by using the calculated focus information; and
   a controller configured to correct an error included in a relative relationship of distance information between the first image capturer and the second image capturer caused by a deformation of the second image capturer by providing a focus control to the first image capturer using the calculated correction value and the calculated-distance information.

2. The control apparatus according to claim 1, wherein the calculated correction value is a correction value for correcting the distance information.

3. The control apparatus according to claim 1, wherein the calculated correction value is a correction value for correcting data representing a relationship between the calculated focus information and the calculated distance information.

4. The control apparatus according to claim 1, wherein the correction value calculator calculates the correction value by further using the distance information.

5. The control apparatus according to claim 1, wherein the calculated focus information is information on a position of a focus lens in the first image capturer.

6. The control apparatus according to claim 1, wherein the controller provides a first focus control over the first image capturer using the calculated correction value and the calculated distance information, and then provides a second focus control over the first image capturer using the calculated focus information.

7. The control apparatus according to claim 6, wherein the second focus control is a focus control by a contrast autofocus.

8. The control apparatus according to claim 1, wherein the distance information calculator calculates the distance information by using a parallax amount between two image signals obtained via the second image capturer.

9. The control apparatus according to claim 1, further comprising a determiner configured to determine whether or not the correction value is to be calculated,
   wherein the correction value calculator calculates the correction value in a case where the determiner determines that the correction value is to be calculated.

10. The control apparatus according to claim 1, further comprising an area selector configured to select an area for calculating the focus information,
   wherein the focus information calculator calculates the focus information in the area selected by the area selector.

11. The control apparatus according to claim 10, wherein when selecting as the area a first area located outside an image capturing visual field of the first image capturer, the area selector sets a second area located within the image capturing visual field of the first image capturer, as an area for calculating the correction value.

12. The control apparatus according to claim 10, wherein when selecting as the area the first area located within the image capturing visual field of the first image capturer, the area selector sets the first area as an area for calculating the correction value.

13. An image capturing apparatus comprising:
   a control apparatus including a focus information calculator configured to calculate focus information by using an image signal obtained via a first image capturer, a distance information calculator configured to calculate distance information on a distance to an object by using an image signal obtained via a second image capturer, a correction value calculator configured to calculate a correction value by using the calculated focus information, and a controller configured to correct an error included in a relative relationship of distance information between the first image capturer and the second image capturer caused by a deformation of the second image capturer by providing a focus control to the first image capturer using the calculated correction value and the calculated distance information; and
   the second image capturer having at least one image capturing optical system.

14. The image capturing apparatus according to claim 13, further comprising the first image capturer including an image capturing optical system including a focus lens.

15. The image capturing apparatus according to claim 14, wherein the second image capturer has an angle of field wider than an angle of field of the first image capturer.

16. The image capturing apparatus according to claim 13, wherein the second image capturer has a depth of field deeper than a depth of field of the first image capturer.

17. The image capturing apparatus according to claim 13, wherein the second image capturer further includes an image sensor configured to receive light passing through different pupil areas in one image capturing optical system.

18. The image capturing apparatus according to claim 17, wherein the image sensor has a plurality of photoelectric converters, and a plurality of two-dimensionally arrayed micro lenses, each of the plurality of two-dimensionally arrayed micro lenses being provided to the plurality of photoelectric converters.

19. The image capturing apparatus according to claim 13, wherein the second image capturer includes at least two image capturing optical systems, each of the at least two image capturing optical system being a fixed-focal-length image capturing optical system having the same focal length.

20. A control method comprising:
   calculating focus information by using an image signal obtained via a first image capturer;
   calculating distance information on a distance to an object by using an image signal obtained via a second image capturer;
   calculating a correction value by using the calculated focus information; and
   correcting an error included in a relative relationship of distance information between the first image capturer and the second image capturer caused by a deformation of the second image capturer by providing a focus control to the first image capturer using the calculated correction value and the calculated distance information.

21. A non-transitory computer-readable storage medium storing a program for causing a computer to execute a control method,
   wherein the control method includes:
   calculating focus information by using an image signal obtained via a first image capturer;
   calculating distance information on a distance to an object by using an image signal obtained via a second image capturer;
   calculating a correction value by using the calculated focus information; and
   correcting an error included in a relative relationship of distance information between the first image capturer and the second image capturer caused by a deformation of the second image capturer by providing a focus control to the first image capturer using the calculated correction value and the calculated distance information.

* * * * *